Figure 1:
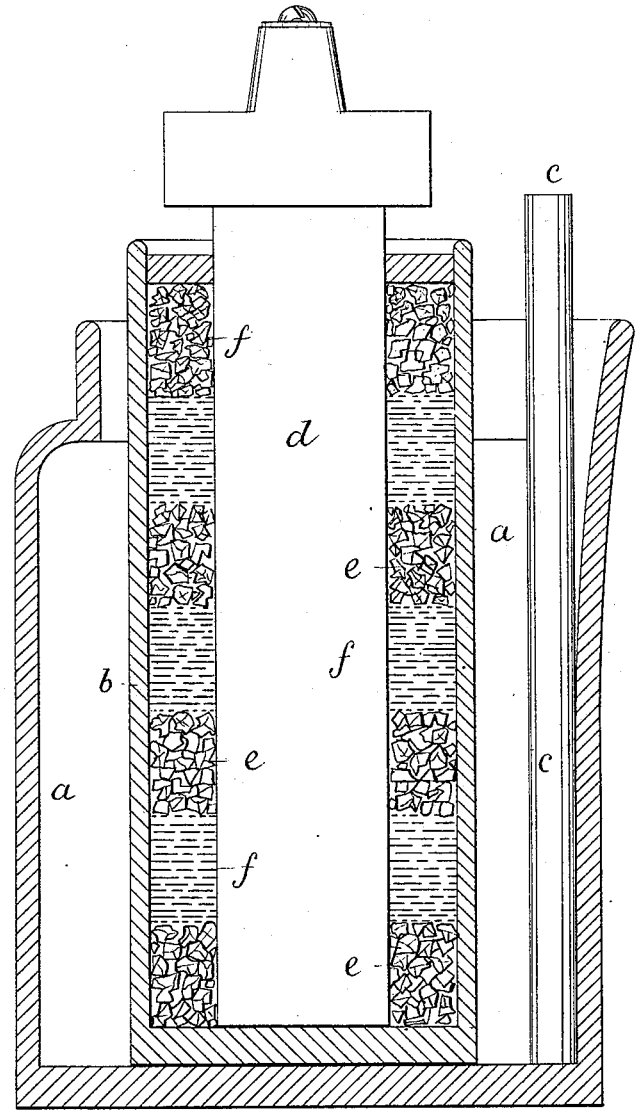

(No Model.)

J. H. CHEEVER.
Galvanic Battery.

No. 233,601.  Patented Oct. 26, 1880.

WITNESSES—
Arthur Reynolds.
V. D. Dearborn.

INVENTOR—
Jos. H. Cheever
by Crosby Gregory Attys.

UNITED STATES PATENT OFFICE.

JOSEPH H. CHEEVER, OF SOMERVILLE, MASSACHUSETTS, ASSIGNOR TO AMERICAN BELL TELEPHONE COMPANY.

GALVANIC BATTERY.

SPECIFICATION forming part of Letters Patent No. 233,601, dated October 26, 1880.

Application filed July 6, 1880. (No model.)

*To all whom it may concern:*

Be it known that I, JOSEPH H. CHEEVER, of Somerville, county of Middlesex, State of Massachusetts, have invented an Improvement in Galvanic Batteries, of which the following description, in connection with the accompanying drawing, is a specification.

My invention relates to galvanic batteries, and is shown embodied in a battery constructed on the plan of the well-known Leclanché battery.

It consists in the use, in connection with the carbon or positive electrode, of granular or fragmentary solid matter, such as broken coke or carbon, and a depolarizing agent or material arranged in alternate layers, and also in a porous cup containing chloride of lime or bleaching-powder and fragments of carbon so arranged.

The arrangement in layers reduces the internal resistance by allowing a more ready and free access of the conducting-liquid to the surface of the carbon than is commonly attained when the said depolarizing material is intimately mixed with the broken carbon, it then covering the surface thereof and clogging the battery.

The drawing shows a cell in vertical section illustrating my invention.

The outer containing-jar, $a$, the porous cup $b$, and the zinc and carbon electrodes $c$ $d$ may be of any usual form, being herein shown as of the form usually employed in the well-known Leclanché battery.

Instead of using peroxide of manganese or of lead in the porous cell $b$, surrounding the carbon electrode $d$, as usually practiced, I employ chloride of lime (bleaching-powder) and broken or fragmentary carbon or coke, arranged, as shown, in alternate horizontal layers, the carbon being designated by the letter $e$, and the chloride of lime by the letter $f$. This arrangement, while allowing the chloride of lime to act properly as a depolarizing agent, affords ready access to the surface of the broken carbon $e$ and electrode $d$ for the exciting-liquid contained in the outer jar, $a$. This exciting-liquid may be the usual solution of sal-ammoniac, or any other suitable acid or saline solution.

The herein-described battery is more constant in action and of lower internal resistance, and consequently more effective than the ordinary Leclanché battery, and does not so readily clog nor require so much attention.

I am aware that a battery has been heretofore made in which compounds of chlorine are used as the electrolyte or exciting material, and I do not broadly claim the use of chlorine compounds in a galvanic battery.

I am also aware of the use of chloride of lime and equivalent compounds as depolarizing agents in connection with a carbon electrode, and I do not, therefore, claim the same herein.

I claim—

1. In a galvanic cell, a depolarizing agent or material arranged in alternate layers with granular or fragmentary solid matter, such as broken coke or carbon, substantially as described.

2. A galvanic cell and a porous cup therein containing chloride of lime and fragments of carbon arranged in alternate layers, substantially as and for the purpose set forth.

In testimony whereof I have signed my name to this specification in the presence of two subscribing witnesses.

JOSEPH H. CHEEVER.

Witnesses:
  JOS. P. LIVERMORE,
  N. E. C. WHITNEY.